United States Patent [19]

Hunter

[11] Patent Number: 5,076,927

[45] Date of Patent: Dec. 31, 1991

[54] BIOCATALYZED PARTIAL DEMINERALIZATION OF ACIDIC METAL SULFATE SOLUTIONS

[76] Inventor: Robert M. Hunter, 320 S. Willson Ave., Bozeman, Mont. 59715

[21] Appl. No.: 166,033

[22] Filed: Mar. 9, 1988

[51] Int. Cl.$^5$ .......................... C02F 3/28; C02F 11/04
[52] U.S. Cl. .................................. 210/603; 210/610; 210/613; 210/614; 210/631; 210/912; 435/262; 435/801
[58] Field of Search ............... 210/603, 607, 609, 610, 210/613, 614, 615–618, 631, 912, 916, 605; 435/240.45, 244, 247–249, 252.4, 262, 267, 801, 813

[56] References Cited

U.S. PATENT DOCUMENTS

| | | | |
|---|---|---|---|
| 3,981,800 | 9/1976 | Ort | 210/603 |
| 4,022,665 | 5/1977 | Ghosh et al. | 210/603 X |
| 4,200,523 | 4/1980 | Balmat | 210/4 |
| 4,293,333 | 10/1981 | Drobot | 75/101 |
| 4,297,216 | 10/1981 | Ishida et al. | 210/613 |
| 4,384,956 | 5/1983 | Mulder | 210/603 |
| 4,442,006 | 4/1984 | Ishida et al. | 210/613 |
| 4,519,912 | 5/1985 | Kauffman et al. | 210/611 |
| 4,522,723 | 6/1985 | Kauffman et al. | 210/611 |
| 4,664,804 | 5/1987 | Morper et al. | 210/605 |
| 4,666,852 | 5/1987 | Cork | 435/262 |
| 4,735,724 | 4/1988 | Mulder | 210/603 |

OTHER PUBLICATIONS

Grimm, D. T. et al., Optimization of Desulfobacter for Sulfate Reduction, *Developments in Ind. Microb.*, vol. 25, 709–716 (1984).
Ilyaletdinov, A. N. et al., Role of Sulfate-Reducing Bacteria in the Precipitation of Copper, *Microbiol.* (SSR), vol. 46(1), 113–117 (1977).
Middleton, A. C. & Lawrence, A. W., Kinetics of Microbial Sulfate Reduction, *Journal WPCF*, Jul., pp. 1659–1670 (1977).
Tomizuka, Noboru & Yagisawa, Mitsuo, Optimum Conditions in *Metallurgical Applications of Bacterial Leaching*, pp. 321–344, New York: Academic Press (1978).
Tuttle, J. H. et al., Microbial Sulfate Reduction, *Applied Microbiology*, vol. 17, pp. 297–302 (1969).
Uphaus et al., Gypsum Bioconversion to Sulfur, *Developments in Ind. Microb.*, vol. 24, 435–442 (1983).
Yagisawa, M. et al., Recovery of Useful Metals from a Bacetrial Leaching Solution, *Journal of the Mining and Metallurgical Institute of Japan*, vol. 93, pp. 447–452 (1977).

Primary Examiner—Tom Wyse

[57] ABSTRACT

This invention comprises the steps of (1) acid phase anaerobic digestion of biomass to produce volatile acids and a stabilized sludge, (2) use of the volatile acids as the carbon source and electron donor for biological sulfate reduction for removal of acidity, metals and sulfate from acid mine drainage, and to produce acetate, (3) use of the acetate solution as feed for methane phase anaerobic digestion to produce methane and to reduce the organic content of the effluent of the process, (4) and use of the methane to satisfy the energy requirements of the process. Key to the process is the use of kinetic control (i.e., a relatively short mean cell residence time) to ensure partial oxidation of higher molecular weight volatile acids (e.g., propionic, butyric, valeric) and production of acetate during the sulfate reduction step. In this way, the higher molecular weight volatile acids produced during acid phase anaerobic digestion can be used both as electron donors for sulfate reduction (during which they are converted to acetate) and as substrates for the subsequent methane production step.

23 Claims, 3 Drawing Sheets

BIOCATALYZED PARTIAL DEMINERALIZATION OF ACIDIC METAL SULFATE SOLUTIONS

FIELD OF THE INVENTION

This invention relates to a method for neutralizing and removing metals and sulfate from acid mine drainage and other acidic metal sulfate solutions.

DESCRIPTION OF PRIOR ART

A number of investigators have studied the use of sulfate-reducing bacteria (SRB) for treatment of acid mine drainage. The findings of some of those studies are presented below.

Tuttle et al, in Applied Microbiology, Vol. 17, pp. 297-302 (1969), described the potential utility of microbial sulfate reduction as an acid mine drainage water pollution abatement procedure. Batch testing of cultures grown in acid mine drainage (pH 3.6) and wood dust at various temperatures indicated that more sulfate was reduced at 37 C. than at 25 C. or 50 C. Enrichment of wood dust-acid water cultures with sodium lactate resulted in a pH increase from 3.6 to 7.0 in a 10-day period.

King et al, Journal of Water Pollution Control Federation, Vol. 46, pp. 2301-2315 (1974), described the use of sulfate-reducing bacteria in accelerating the rate of acid strip mine lake recovery. They indicated that the key to the process is the accrual of enough organic material at the bottom of the lake to allow generation of suitably reduced conditions for sulfate-reducing bacteria to grow. They noted significant differences in both acidity (2,660 mg/l vs 0 mg/l) and specific conductance (6,400 micromho/cm vs 230 micromho/cm) in lakes that were attributed to the process.

Ilyaletdinov and Loginova reported the findings of batch testing of the use of sulfate-reducing bacteria for removal of copper from the effluent of the Balkhash Mining and Metallurgical Combine in Microbiology, Vol. 46, pp. 92-95 (1977). They were able to reduce copper concentrations of 0.08 mg/l in setting pond effluent (with a sulfate concentration of 1,200 mg/l and lactate as a carbon source) to 0.02 mg/l within a few weeks. Batch testing of treatment of effluent from the secondary settling pond with chopped reed and ammonium sulfate additions showed that 1.0 mg/l concentrations of copper could be reduced to zero in 10 days.

The concept was also tested in continuous culture in a six-section reactor with a residence time of 10 days. The bottom of the reactor was covered with mud to provide a habitat for the bacteria. At 25 C., the reactor was able to reduce an initial concentration of copper of 1.26 mg/l to zero.

In 1977 and again in 1978, Yagisawa et al presented the results of continuous recovery of metals from a solution prepared by bacterial leaching of copper sulfide ore. See Noboro and Yagisawa in Metallurgical Applications of Bacterial Leaching and Related Microbiological Phenomena, pp. 321-344, New York: Academic Press (1978) and Yagisawa et al, Journal of the Mining and Metallurgical Institute of Japan, Vol. 93, p. 447 (1977). Batch culture of sulfate-reducing bacteria in the leaching solution was impossible because of the low pH and high concentration of metals in the solution.

The specific growth rate and the rate of removal of metals were found to be strongly influenced by the pH of the culture. The optimum pH for metal removal and the optimum pH for growth was 6. In continuous culture at 30 C. and pH 6, the maximum rate of metals removal occurred at 40 percent of the metal concentration of the original solution. The original solution contained 270.0 mg/l copper, 102.5 mg/l zinc and 135.0 mg/l iron. Sodium lactate and yeast extract were added to the culture. A black precipatate was produced that contained 19.96 percent copper, 6.13 percent zinc and 10.95 percent iron.

Olson and McFeters, Microbial Sulfur Cycle Activity at a Western Coal Strip Mine, Bozeman, MT: Montana University Joint Water Resources Center (1978), described microbial sulfur cycle activity. The sediments of the mine settling pond supported a large and active population of sulfate-reducing bacteria, producing up to 10.5 mg hydrogen sulfide per liter of sediment per day. Metal bound sulfides were found to comprise, at times, over 0.2 percent of the dry weight of pond sediments, leading the investigators to suggest that sulfate-reducing bacteria were precipitating heavy metals in the pond.

Cork and Cusanovich reported the findings of batch studies of biological conversion of sulfate in solvent extraction raffinates, a waste product of hydrometallurgical copper ore processing, to elemental sulfur. For reference see Murr et al (eds.), Metallurgical Applications of Bacterial Leaching and Related Microbiological Phenomena, pp. 207-222, New York: Academic (1978). *Desulfovibrio desulfuricans* was used for sulfate-reduction and either of the photosynthetic bacteria *Chlorobium thiosulfatophilum* or *Chromatium vinosum* was used for conversion to elemental sulfur. The organisms were cultured separately and a purge system using an inert carrier gas was used to transfer hydrogen sulfide gas from one culture to the other. Lactic acid and yeast extract were used as the carbon source for sulfate reduction. With Chlorobium, an overall process conversion rate of 55 percent was achieved.

Cork and Cusanovich presented the results of pilot scale batch and continuous culture studies of the two-stage conversion process they introduced in 1978. Reference may be made to Developments in Industrial Microbiology, Vol. 20, pp. 591-602 (1979). The tests were carried out at an optimum temperature of 30 C. and an optimum pH of 7.0. At an initial sulfate concentration of 13,400 mg/l, a conversion rate of 91 percent was achieved using lactic acid as the carbon source for sulfate reduction. Utilization of Chlorobium biomass as an alternate carbon source was investigated, but only 10 percent of the required carbon could be supplied in that manner. The investigators suggested using other carbon sources such as raw sewage.

Uphaus et al described another version of purged microbial mutualism using *Desulfobacter postgatei*, a sulfur-reducing bacterium capable of using acetate as it sole preformed carbon source. For reference see Developments in Industrial Microbiology, Vol. 24, pp. 435-442 (1983). This substrate is more economical than lactate and the products of its metabolism include carbon dioxide and hydrogen sulfide which can serve as feed gas for the growth of photosynthetic green sulfur bacteria. Rigid compressed panels of fiberglass taken from commercial ceiling panels were used as a solid support matrix for the cells of the sulfate-reducing bacteria. Addition of concentrated, cell-free Chlorobium culture supernatant to the immobilized Desulfobacter culture increased sulfate reduction rates by 3 to 4 times.

Grim et al described the findings of batch and continuous culture studies of sulfate reduction by an acetate-utilizing strain *Desulfobacter postgatei*. For reference see Developments in in Microbiology, Vol. 25, pp. 709-716 (1984). Growth was optimized by constant pH control, slow nitrogen purge to prevent inhibition by the sulfide ion, and immobilization of cells in a continuously stirred tank reactor. A ferric sulfate precipitate adhered to the wall of the reactor apparently allowing cell numbers to increase and facilitating increased sulfate reduction.

The acid-formation phase of anaerobic digestion has been thoroughly reviewed. See for example, Toerien and Jaffingh, Water Research, Vol. 3, pp. 385-416 and Zehnder, in Mitchell (ed.). Water Pollution Microbiology, New York: John Wiley and Sons (1978). Its outcome is the conversion of complex organic matter into saturated fatty (volatile) acids, carbon dioxide and ammonia. The volatile acids have been found to be acetic, propionic and butyric acids with lesser amounts of formic, lactic and valeric acids. For reference see Toerien and Jaffingh in the above-noted publication. Acetic acid is the most plentiful followed by propionic acid. Acid phase anaerobic digestion has been successfully accomplished on a laboratory scale by many investigators. Examples include the following references: Ghosh et al, Journal of the Water Pollution Control Federation, Vol. 47(1), pp. 30-45; Heijmem, Biological Industrial Waste-Water Treatment Minimizing Biomass Production and Maximizing Biomass Concentration, Delft, Holland: Delft University Press (1984); Pohland and Ghosh, in Proceedings of Biotechnology and Bioengineering Symposium, Vol. 2, pp. 85-106 (1971); and Pohland and Ghosh, Environmental Letters, Vol. 1(4), pp. 255-266 (1971), Marcel Dekker, Inc. The maximum specific growth rate, $\mu_{max}$ of acidifying bacteria is about 0.3 to 0.5 hr$^{-1}$. See Heijmem referenced in this paragraph.

The methane-production phase of anaerobic digestion has been accomplished in conventional chemostats, in fluidized bed reactors and in packed bed reactors. Reference is made to Ghosh et al, Journal of the Water Pollution Control Federation, Vol. 47(1), pp. 30-45 and Heijmem, Biological Industrial Waste-Water Treatment Minimizing Biomass Production and Maximizing Biomass Concentration, Delft, Holland: Delft University Press (1984). Several workers have noted that when acetic, propionic and butyric acids are subjected to methane-phase anaerobic digestion, only acetic and butyric acids are metabolized. Propionic acid is only degraded when acetic acid concentrations have reached low levels. Examples of this literature include Cappenberg, Microbial Ecology, Vol. 2, pp. 60-72; Heijmem, as cited above, and Pohland and Ghosh, Environmental Letters, Vol. 1(4), pp. 255-266 (1971), Marcel Dekker, Inc.

When anaerobic digestion is divided into two phases kinetically, two populations of bacteria occur in the methane production phase. The first group are acetogenic bacteria which convert propionic and butyric acids into acetate and hydrogen. The $\mu_{max}$ of this population is about 0.01 hr$^{-1}$. The second group is a methanogenic population which converts acetate or hydrogen and carbon dioxide into methane. The $\mu_{max}$ of this population is about 0.05 hr$^{-1}$ with hydrogen plus carbon dioxide as substrate and 0.01 hr$^{-1}$ to 0.03 hr$^{-1}$ with acetate as substrate. The biomass yield of both groups is very low.

OBJECTIVES OF THE INVENTION

It is an object of the invention to provide a method for microbial removal of heavy metals, acidity and sulfate from acidic metal sulfate solutions such as acid mine drainage. It is a further object of the invention to provide a method of treatment of acid mine drainage without the need for input of preformed chemicals, such as electron donors, and without the need for input of energy. It is also an object of the invention to economically recover sulfur from wastewaters containing dissolved sulfate.

SUMMARY OF THE INVENTION

The objects of this invention are provided by a process that relies on kinetic control to ensure incomplete oxidation of electron donors during sulfate reduction with conversion of acetate to methane in a subsequent step in the process.

The proposed process will allow treatment and acid mine drainage and, in fact, any acid wastewater containing excessive concentrations of metals and sulfates, more effectively and at lower cost than with conventional treatment methods. It has been estimated that 10,000 miles of streams and 29,000 surface acres of impoundments are seriously affected by mine drainage. About 40 percent of this drainage comes from active mines; the remainder from abandoned surface mines (25 percent) and shaft and drift mines (75 percent). Reference may be made to Goldhaber and Kaplan in Goldberg (ed.), The Sea, Vol. 5, New York: John Wiley and Sons (1974).

The free mineral acid loads associated with coal mine drainage alone in the United States exceed 5,300 tons per day. Reference is made to Zobell, Ecology of Sulfate-Reducing Bacteria, Pennsylvania Oil Production Association, Vol. 22, pp. 12-29 (1958). Neutralization of this acidity would consume over 1,100,000 tons of lime per year. Manufacture of this amount of lime would consume about 5 trillion BTU per year. The proposed process could eliminate this requirement.

Neutralization of acidity with lime does not reduce dissolved sulfate levels. Lime addition to such waters usually results in oversaturation of the water with calcium sulfate (gypsum). Subsequent gypsum precipitation typically causes scaling in downstream treatment units and cementation of gravels in natural stream beds lowering their habitat value. With the proposed invention, this problem would not occur.

Anaerobic digestion of an amount of wastewater treatment sludge sufficient to provide electrons for reduction of 500 mg/l of sulfate in 0.5 million gallons per day (mgd) of acid mine drainage would also provide sufficient methane to heat the mine drainage to 37 degrees C.

BRIEF DESRIPTION OF THE DRAWINGS

FIG. 1 presents a highly schematic block diagram illustrating a first representative embodiment of the invention, said embodiment comprising the steps of biological sulfate reduction and methane phase anaerobic digestion.

FIG. 2 presents a highly schematic block diagram illustrating a second representative embodiment of the invention, said embodiment comprising the additional step of acid phase anaerobic digestion.

FIG. 3 presents a highly schematic block diagram illustrating a third representative embodiment of the invention in which biological sulfate reduction is conducted as a batch operation.

DETAILED DESCRIPTION OF THE INVENTION

Figure 1:
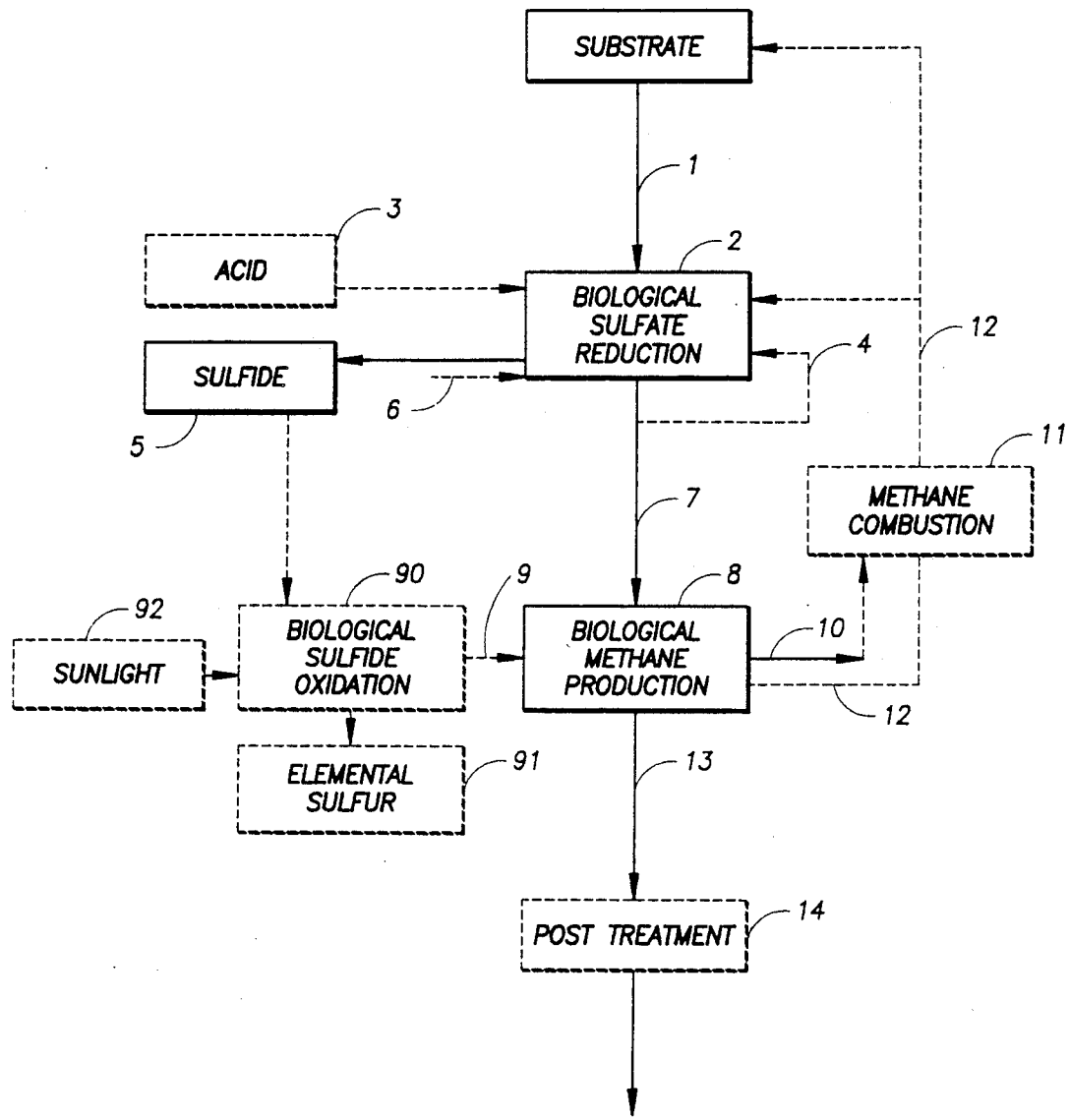

Reference is now made to FIG. 1 which is a highly schematic block diagram illustrating a representative embodiment of the invention, the dotted lines representing possible variations in the process. Substrate 1 is the input to the process, and, under certain conditions, may be the only chemical input to the process. Substrate 1 contains dissolved sulfate ions and at least one dissolved electron donor with a molecular weight greater than that of acetic acid. Examples of such electron donors include propionic acid, propionate ion, butyric acid, butyrate ion, lactic acid and lactate ion. These substances are termed electron donors because it is their purpose to serve as such during the biological reduction of sulfate to sulfide. Acetic acid or acetate ion may or may not be present in the substrate. The molar concentration of electron donors with molecular weights greater than that of acetic acid are such that the cumulative number of moles is greater than that required for incomplete oxidation of the electron donor and essentially complete microbial reduction of the sulfate present in substrate 1. Examples of stoichiometric requirements for electron donors are available in the literature. Reference may be made to Pfennig and Widdel, in Biology of Inorganic Nitrogen and Sulfur, Bothe and Trebst (eds.), pp. 169–177, New York: Springer-Verlag (1981).

Examples are given below:

| Electron donor | Moles of sulfate required per mole of electron donor |
|---|---|
| Propionate | 0.75 |
| Butyrate | 0.50 |
| Valerate | 1.0 |
| Lactate | 0.50 |

The electron donors are provided in excess to ensure that they are not exhausted prior to essentially complete removal of sulfate. The situation also ensures that utilization of one of the products of incomplete oxidation of the electron donors, acetate, is not required for sulfate reduction. If substrate 1 contains sufficient acid to neutralize the basic (caustic) product(s) of microbial sulfate reduction, e.g., bicarbonate, then addition of acid to the sulfate reducing (first) reactor 2 is not required. In this case, substrate 1 is added to first reactor 2 at the rate needed to maintain the pH in the range 6.0 to 8.0. Otherwise, an acid 3 such as sulfuric acid or hydrochloric acid is added to the first reactor 2 to maintain the pH in the correct range. First reactor 2 is maintained at a temperature in the range 20 degrees C. to 40 degrees C.

First reactor 2 may be innoculated with sulfate-reducing bacteria (SRB) but innoculation would not normally be necessary because of their ubiquitous nature. The concentration of SRB maintained in first reactor 2 is such that the mean cell residence time is less than that required for complete oxidation of the electron donor(s) by SRB at the selected pH and temperature. Under conditions of suspended growth, if cell recycle 4 is not practiced, the relationship between the flow rate of substrate into first reactor 2 and the mean cell residence time is as follows:

$$MCRT = V/Q$$

where
MCRT = mean cell residence time
Q = volumetric flow rate
V = volume of reactor Thus, either the flow rate into first reactor 2 or the volume of first reactor 2 is adjusted to meet the above criterion. If 100 percent efficient cell recycle 4 is practiced, the mean cell residence time is as follows:

$$MCRT = V/F_w$$

where $F_w$ = volumetric flow rate of removal of reactor contents containing cells (waste sludge removal rate)

In a reactor operated at a given mean cell residence time, microorganisms reproducing (doubling) at a rate such that their mean cell residence time is greater than approximately the reactor residence time (TD = V/Q) will be washed out of the reactor. Such microorganisms will not be present at sufficient concentrations sufficient to effectively utilize substrate delivered to the reactor. Actually, Monod growth kinetics predicts that washout, the loss of all cells of a particular organism, will occur for dilution rates, D = Q/V, greater than the maximum dilution rate $D_{max}$, in which $D_{max} = \mu_{max} S_o/(K_s + S_o)$
$D_{max}$ = maximum dilution rate (Q/V), hr$^{-1}$
$\mu_{max}$ = maximum organism specific growth rate, that is, the maximum growth rate achievable by a particular organism when the concentration of limiting nutrient in the reactor is much greater than $K_s$ and the concentrations of all other essential nutrients are unchanged, hr$^{-1}$
$S_o$ = limiting nutrient concentration in substrate (feed), mg/l
$K_s$ = value of limiting nutrient concentration at which the specific growth rate is half its maximum value, mg/l Because $S_o$ is always much greater than $K_s$ in the systems disclosed herein, $D_{max}$ may be assumed to be approximately equal to $\mu_{max}$.

Various researchers have found that SRB grow more slowly when they utilize acetate as a substrate than when they utilize higher molecular weight electron donors. For example, F. Widdel and N. Pfenning found that pure cultures of *Desulfotomaculum acetoxidans* grew faster on butyrate than on acetate (15 hr doubling time instead of 30 hr). This reference is found in Bothe and Trebst (eds.), Biology of Inorganic Nitrogen and Sulfur, pp. 169–177, New York: Springer-Verlag, (1981). Similarly, Widdel et al found that pure culture of *Desulfonema limicola* and *Desulfonema magnum* grew faster on propionate, butyrate or valerate than on acetate. Reference may be made to Archives of Microbiology, Vol. 134, pp. 286–294 (1983). Volume one of Bergey's Manual of Systematic Bacteriology (1984), reported that species that carry out complete oxidation of propionate, such as *Desulfococcus multivorans* and *Desulfosarcina variasilis*, grow more slowly than does *Desulfobulbus propionicus* which oxidized propionate incompletely to acetate. Furthermore, Traore et al have shown that SRB grow more rapidly on substrates from which they derive more energy. See for reference Journal of Bacteriology, Vol. 145(1), pp. 191–199. Thauer et al have shown that SRB derive more energy from incomplete oxidation of electron donors other than acetate than they do from complete oxidation of those electron donors. Refer to Bacteriological Review, Vol.

41, pp. 100–180 (1977). Furthermore, SRB derive more energy from complete oxidation of electron donors other than acetate than they do from complete oxidation of acetate. Examples are as follows:

| Electron donor | Product | Free energy change per each two electrons transferred, $\Delta G^{\circ\prime}$, kJ |
|---|---|---|
| Acetate | Carbon dioxide | −11.83 |
| Propionate | Carbon dioxide | −12.10 |
| Butyrate | Carbon dioxide | −12.24 |
| Propionate | Acetate + $CO_2$ | −12.63 |
| Butyrate | Acetate | −13.92 |
| Formate | Carbon dioxide | −36.68 |
| Lactate | Acetate + $CO_2$ | −40.08 | where $\Delta G^{\circ\prime}$ = free energy change at pH 7.

From the above, it is apparent that operation of first reactor at mean cell residence time less than that required for oxidation of acetic acid by SRB at any selected pH and temperature will cause oxidation of the other electron donors in substrate 1.

As an example, Middleton and Lawrence, Journal WPCF, pp. 1659–1670 (1977) found that at a temperature of 31 degrees C., a mixed culture of SRB could grow at a maximum specific growth rate, $\mu_{max}$, of 0.022 hr$^{-1}$ where $\mu = Q/V$ in a chemostat without cell recycle. Thus, under these conditions, operation of first reactor 2 at a mean cell residence time less than about $1/\mu_{max} = 45$ hr would ensure that oxidation of any electron donor present in the substrate with a molecular weight greater than that of acetic acid would occur. Middleton and Lawrence also found that the $\mu_{max}$ of SRB using acetate as the electron donor for sulfate reduction at an unreported pH varied with temperature as follows:

| Temperature Degrees C. | $\mu_{max}$, hr$^{-1}$ |
|---|---|
| 20 | 0.014 |
| 25 | 0.019 |
| 31 | 0.022 |

Because one of the products of microbial sulfate reduction, dissolved sulfide, inhibits the growth of SRB, removal of this substance is necessary to ensure rapid growth. If sufficiently high concentrations of dissolved metal(s) are present in (or are added to) substrate 1, dissolved sulfide will be removed by precipitation as metal sulfide. See for example, Cork and Cusanovich, Developments in Industrial Microbiology, Vol. 20, pp. 591–602 (1979). If insufficient metals are present, excess sulfide may be removed at pHs near and above 7 (neutral) by purging the reactor with a gas other than oxygen, such as nitrogen. See for example, Cork and Konan, Developments in Industrial Microbiology, Vol. 26, pp. 41–52 (1985).

High dissolved sulfide concentrations also inhibit the growth of methanogenic (methane-producing) bacteria (MB). However, Heijmem found that dissolved sulfide concentrations up to 160 mg/l have been found not to inhibit the growth of MB. This research was described by Heijmem in Biological Industrial Waste-water Treatment Minimizing Biomass Production and Maximizing Biomass Concentration, Delft, Holland: Delft University Press (1984).

Sulfide removed from first reactor 2 may be biologically converted to relatively pure elemental sulfur 91 in third reactor 90. This is accomplished by innoculating third reactor 90 with a green sulfur bacteria such as *Chlorobium limicola f.* sp or *Chlorobium thiosulfatophilum*, exposing the reactor to a source of light such as sunlight 92. Detail of this step of the process may be obtained by reference to Uphouse et al, Developments in Industrial Microbiology, 24, pp. 435–442 (1983).

Liquid effluent 7 is delivered to second reactor 8. The liquid effluent 7 of a first reactor 2 operated as indicated above contains a relatively high concentration of acetate and relatively low concentrations of sulfate, sulfide, and higher molecular weight electron donors. If first reactor 2 is operated at a pH between 6.8 and 7.4, then no chemical additions are required to operate second reactor 8 in that pH range. If this is not the case, then acid or base 9 is added to second reactor 8 to cause the reactor to operate within a pH range of about 6.8 to 7.4.

Second reactor 8 is operated at a temperature between 20 degrees to 65 degrees C. it is also operated at a mean cell residence time greater than that required for utilization of acetic acid by MB at the selected pH and temperature. Under conditions of suspended growth, this is achieved as was noted above recognizing that the $\mu_{max}$ of this MB population is about 0.01 hr$^{-1}$. If the MB are grown in biofilms (e.g., in a fluidized bed reactor), then the theoretical mean MB cell residence time is infinite. Colonization of MB in the biofilm may be encouraged by maintaining the hydraulic residence time of the second reactor 8 at less than 100 hours.

Gaseous methane 10 generated in second reactor 8 is removed from the reactor. Methane 10 may be burned in methane combustion unit 11 and energy 12 used to heat substrate 1, first reactor 2, and second reactor 8. Alternatively, methane combustion unit 11 may be an engine generator, in which case energy 12 may be produced in the forms of electricity and waste heat. The electricity may be used to power electrical equipment associated with first reactor 1 and second reactor 8 such as pumps and mixers. The waste heat may be used to heat substrate 1, first reactor 2 and second reactor 8 as noted above.

Effluent 13 is removed from second reactor 8. It may undergo aerobic post treatment 14 prior to release to the environment.

Figure 2:
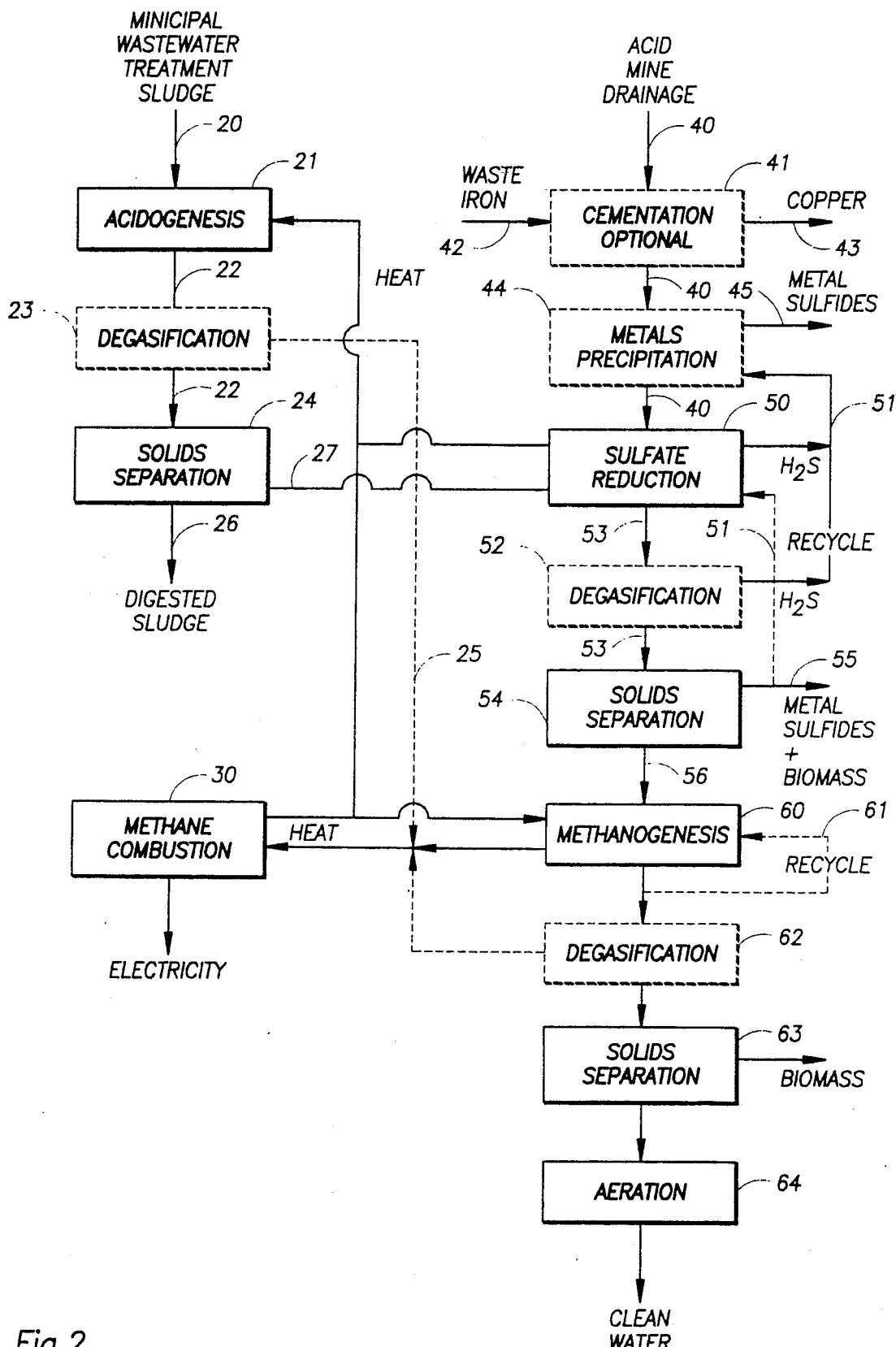

Reference is now made to FIG. 2 which is a highly schematic block diagram illustrating a second alternative representative embodiment of the invention, which is the best mode, the dotted lines representing possible variations in the process. With this embodiment, biomass 20 is subjected to acid phase anaerobic digestion (acidogenesis) in digester 21. Biomass 20 may be an easily degraded substance such as municipal wastewater treatment sludge or a milk-processing waste stream such as whey. Biomass 20 may also be a substance requiring pretreatment by acid or caustic hydrolisis prior to anaerobic digestion. Several embodiments of acid phase anaerobic digestion and pretreatment schemes are described in U.S. Pat. No. 4,022,665. Other embodiments of acid phase anaerobic digestion that incorporate hydrogen management techniques are described by Harper and Pohland, Biotechnology and Bioengineering, Vol. 28, pp. 585–602 (1986).

The effluent 22 from the acidogenesis process may undergo degasification 23 to facilitate subsequent solids separation 24. Degasification 23 may be accomplished by vacuum degasification. Solids separation 24 may be accomplished by settling, by centrifugation, or by vacuum or pressure filtration. The gas 25 removed during degasification 23 could be routed to a methane combustion process 30.

The semisolid portion 26 of the output of solids separation 24 may undergo further processing prior to utilization as a soil amendment or disposal or it may be used or disposed of directly. If the semisolid portion 26 is further processed by anaerobic digestion, the gas produced may also be routed to methane combustion process 30.

Referring to the process train on the right side of FIG. 2, acid mine drainage 40 may undergo cementation 41 prior to subsequent processing. Cementation should be used to reduce copper concentrations in acid mine drainage 40, if said copper concentrations exceed about 100 mg/l. Cementation is an oxidation-reduction reaction accomplished by passing an acidic solution containing dissolved copper through finely divided waste iron 42. During the process, iron is dissolved and copper 43 is removed from the solution as a precipitate.

Acid mine drainage 40 may also be pretreated in metals precipitation reactor 44. In this reactor, acid mine drainage is mixed with excess hydrogen sulfide gas 51 evolved in sulfate reduction reactor 50. The reaction of metals in the acid mine drainage 40 with the gas 51 produces metal sulfides 45.

Acid mine drainage 40 and the liquid portion 27 of the output of solids separation 24 are delivered to sulfate reduction reactor 50. Sulfate reduction reactor 50 is operated in a manner similar to that described for second reactor 8 in the previous embodiment of the invention. Cell recycle 51 and/or degasification 52 may be practiced.

The effluent 53 from the sulfate reduction reactor 50 undergoes subsequent solids separation 54. One or more of the solids separation processes mentioned earlier may be used. The semisolid portion 55 of the output of solids separation 54 is removed and will consist primarily of metal sulfides with some biomass.

The liquid portion 56 of the output of solids separation 54 is delivered to methane production reactor 60. Methane production reactor 60 is operated in a manner similar to that described for second reactor 8 in the previous embodiment of the invention. Cell recycle 61, degasification 62 and/or solids separation may be practiced. Post treatment 64 by aerobic treatment may also be practiced prior to discharge or reuse.

Figure 3:
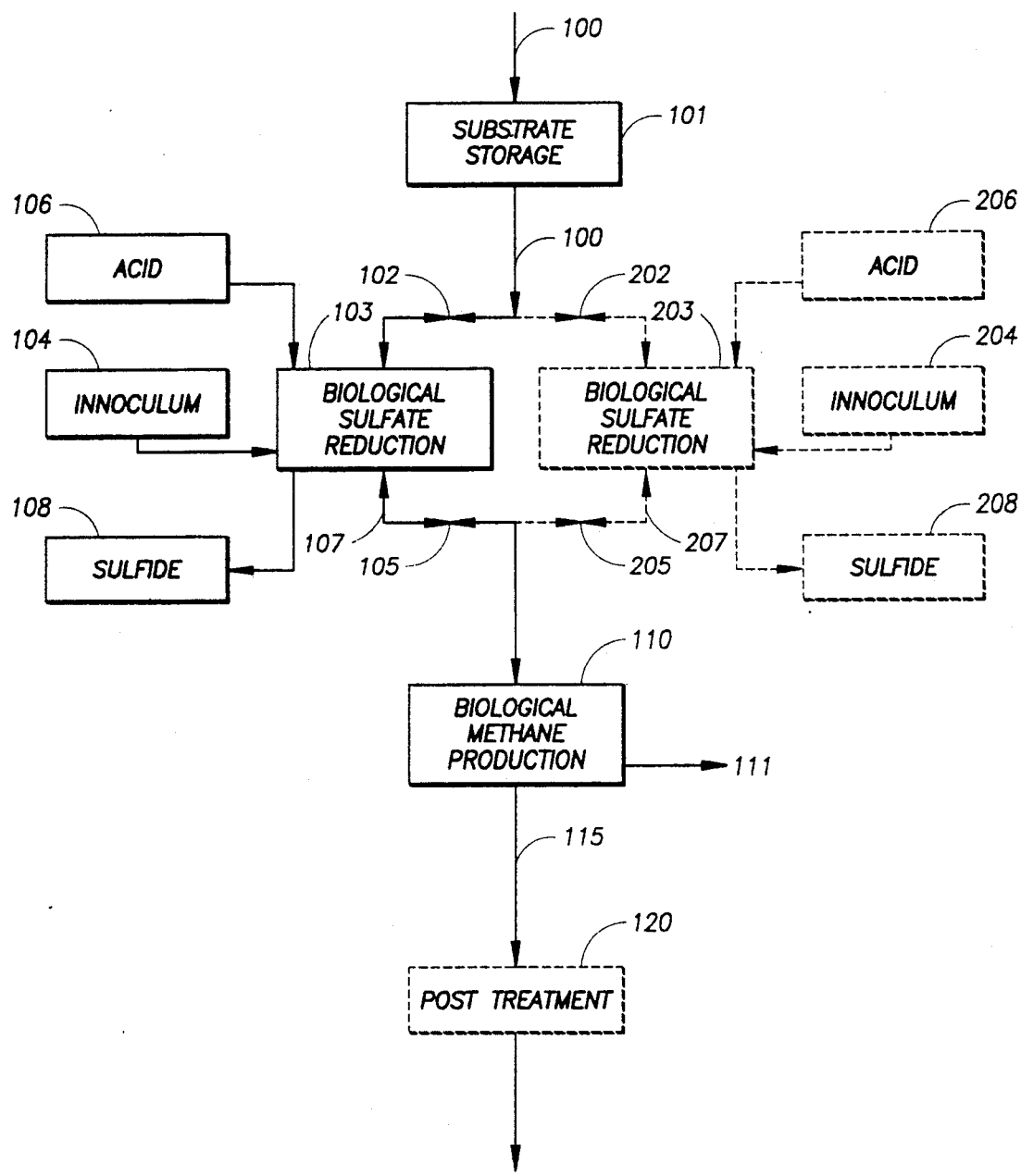

Reference is now made to FIG. 3 which is a highly schematic block diagram illustrating a third alternative representative embodiment of the invention, the dotted lines representing possible variations in the process. With this embodiment, substrate 100 is discharged to substrate storage tank 101 to equalize the flow rate through the process. When valve 102 is opened, and valve 105 is closed, substrate 100 flows into batch sulfate reduction tank 103. The reactor is innoculated with sulfate-reducing bacteria innoculum 104. For highest efficiency, innoculum 104 should be conditioned by growing the bacteria in a medium rich in the highest molecular weight electron donor present in significant quantities in substrate 100. The contents of batch sulfate reduction tank 103 are heated to a temperature of about 35 degrees C. to accelerate the rate of biological action. If substrate 100 contains insufficient acid or buffering capacity to maintain a pH in the range 6.0 to 8.0, acid 106 may be added during the biological sulfate reduction process to maintain the pH in that range. Sulfide 108 is removed from the reactor to prevent the buildup of sulfide concentrations that are toxic to sulfate-reducing bacteria.

The concentrations of electron donors are measured at regular intervals during the process using a conventional technology such as gas chromotography. The sulfate-reducing bacteria present in batch biological sulfate reduction tank 103 will oxidize the electron donors in the order from the electron donor providing the bacteria with the most energy to the electron donor providing the least. All electron donors with a higher molecular weight than acetate will be oxidized before acetate is oxidized with a short time lag between the consumption of each electron donor. With two electron donors in substrate 100, this phenomena is termed diauxic growth; with three electron donors, it is termed triauxic growth. Before the bacteria begin to oxidize the acetate in substrate 100, valve 105 is opened and the effluent 107 is discharged to biological methane production tank 110. Methane 111 produced is removed from methane production tank 110. The effluent 115 from biological methane production tank 110 may undergo post treatment 120 prior to discharge or reuse.

Substrate storage tank 101 may be reduced in size by providing a second sulfate reduction train with components indicated by 200 level numbers on FIG. 3. These components would be used during emptying of biological sulfate reduction tank 103.

WORKING EXAMPLE

Design criteria for a working example of the invention are presented in the following Table I.

TABLE I

| Process/Criteria | Value |
| --- | --- |
| Acidogenesis | |
| Volatile solids loading, grams/liter · hour | 1.67 |
| Dilution rate, per hour | 0.042 |
| Temperature, degrees C. | 35 |
| Products, grams/hour | |
| Acetic acid | 79 |
| Propionic acid | 113 |
| Butyric acid | 84 |
| Degasification | |
| Vacuum, meters of mercury | 0.5 |
| Solids separation | |
| Mass loading rate, kilograms/hour · square meter | 4.9 |
| Sulfate reduction | |
| Sulfate loading, grams/liter · hour | 45 |
| Dilution rate, per hour | 0.031 |
| Temperature, degree C. | 35 |
| pH, units | 7.0 |
| Degasification | |
| Vacuum, meters of mercury | 0.5 |
| Solids separation | |
| Surface loading rate, kilograms/hour · square meter | 4.9 |
| Biofilm methanogenesis | |
| Media specific surface, square meters per cubic meter | 100 |
| Dilution rate, per hour | 0.67 |
| Temperature, degrees C. | 35 |
| pH, units | 7 |
| Degasification | |
| Vacuum, meters of mercury | 0.5 |
| Solids separation | |
| surface loading rate, kilograms/hour · square meter | 4.9 |

The invention is not to be construed as limited to the particular forms disclosed herein, since these are to be regarded as illustrative rather than restrictive. For example, those skilled in the art will realize that in a multiple substrate environment in which diauxic, triauxic or similar growth phenomena are possible, kinetic control (variation of dilution rate) can be used to determine the relative rate of consumption of each substrate present in the feed. Moreover, as indicated by Kompala et al in Biotechnology and Bioengineering, Vo. 26, pp. 1272–1281 (1984), incremental increases in dilution rate cause incremental decreases in the rate of consumption of less preferred substrates. Thus, a kinetically controlled reactor need not be operated only at a dilution rate that causes complete consumption of one substrate, e.g., lactate, and no consumption of another substrate, e.g., acetate. Rather, kinetic control can be used to vary, for example, the rate or percentage of acetate consumption while lactate is completely consumed. Thus, it is the intention of this patent to cover all changes and modifications of the examples of the invention herein chosen for the purposes of the disclosure, which do not constitute departures from the spirit of, and scope of the invention.

I claim:

1. A method for culturing sulfate-reducing bacteria and methane-producing bacteria in at least two reactors in series comprising the steps of:
   delivering to a first reactor a liquid substrate comprising a dissolved sulfate and more moles of at least one dissolved electron donor with a molecular weight greater than that of acetic acid than are required by sulfate-reducing bacteria to biologically reduce at least a portion of the dissolved sulfate,
   fermenting the substrate in the first reactor under anaerobic conditions at a pH between about 6 to 8, at a temperature between about 30 degrees C. to 40 degrees C. and at a mean cell residence time less than that required for essentially complete oxidation of acetic acid by sulfate-reducing bacteria at the selected pH and temperature to produce sulfide and a first liquid effluent, and
   reducing the concentration of the sulfide generated by the fermentation process in the liquid in the first reactor,
   delivering the first liquid effluent from the first reactor to a second reactor,
   fermenting the first liquid effluent in the second reactor at a pH of between about 6.8 to 7.4, at a temperature between about 20 degrees to 65 degrees C. and at a mean cell residence time greater than the mean cell residence time required for essentially complete utilization of acetic acid by methane-producing bacteria to produce methane and a second liquid effluent,
   removing the methane from the second reactor, and
   removing the second liquid effluent from the second reactor.

2. The method in claim 1 in which the first reactor is operated at a mean cell residence time less than that required for complete oxidation of butyrate and propionate to carbon dioxide.

3. The method of claim 1 in which the liquid substrate is acidic and the dissolved sulfate is a metal sulfate derived from acid mine drainage.

4. The method of claim 1 in which the dissolved electron donors include propionic acid and butyric acid derived from acid phase anaerobic digestion of biomass.

5. The method of claim 1 in which the first reactor is operated at a mean cell residence time less than about 30 hours, at a pH of 7.0 and a temperature of 35 degrees C.

6. The method of claim 1 in which the concentration of sulfide in the first reactor is reduced by purging with a gas other than oxygen.

7. The method of claim 1 in which the methane-producing bacteria present in the second reactor exist in biofilms.

8. The method of claim 1 comprising the additional steps of:
   transferring the sulfide removed from the first reactor into a third reactor using an inert carrier gas,
   exposing the contents of the third reactor to a source of light,
   converting the sulfide to elemental sulfur using green sulfur bacteria, and
   removing the elemental sulfur from the third reactor.

9. The method of claim 1 wherein the first reactor is a continuous flow stirred reactor.

10. The method of claim 1 wherein the first reactor is a batch reactor.

11. A method for culturing microorganisms comprising:
    continuously delivering a semisolid biomass feed to an acid phase digester at a loading rate of about 1 to 10 pounds of volatile solids per cubic foot per day,
    fermenting said feed in the acid phase digester under anaerobic conditions at a temperature between about 20 and 40 degrees C. to produce a first effluent,
    removing the first effluent and separating said first effluent into a first semisolid portion and a first liquid portion,
    conveying the first liquid portion of the first effluent to a reactor comprising sulfate-reducing bacteria,
    disposing of the first semisolid portion,
    continuously delivering an acidic wastewater comprising dissolved sulfate and dissolved metals to said reactor comprising sulfate-reducing bacteria at a rate that produces a second effluent having a pH in the range of 6 to 8,
    fermenting a mixture of the wastewater and the first effluent in the reactor at a temperature between about 20 to 40 degrees C.,
    removing the second effluent and separating it into a second semisolid portion and a second liquid portion,
    conveying the second liquid portion to a separate methane phase digester,
    fermenting the second liquid portion in the methane digester at a pH between about 6.8 and 7.4 and a temperature between about 20 and 65 degrees C.,
    removing the methane from the methane phase digester, and
    removing a third effluent from the methane phase digester to process a solid component and a liquid component of the third effluent.

12. A method for culturing microorganisms comprising:
    continuously delivering a semisolid biomass feed to an acid phase digester at a loading rate of about 1 to 10 pounds of volatile solids per cubic foot per day,
    fermenting said feed in the acid phase digester under anaerobic conditions at a temperature between about 20 and 40 degrees C. to produce a first effluent in an acid phase digestion step, removing the first effluent and separating said first effluent into a first semisolid portion and a first liquid portion, conveying the first liquid portion to a reactor comprising sulfate-reducing bacteria, disposing of the first semisolid portion, continuously delivering a wastewater comprising dissolved sulfate to said reactor comprising sulfate-reducing bacteria, fermenting a mixture of the wastewater and the first effluent in the reactor at a pH between about 6 and 8 and a temperature between about 20 to 40 degrees C. to produce hydrogen sulfide and a second effluent in a sulfide reduction step, removing the hydrogen sulfide from the reactor comprising sulfate-reducing bacteria, removing the second effluent and separating said second effluent into a second semisolid portion and a second liquid portion, conveying the second liquid portion to a separate methane phase digester, fermenting the second liquid portion in the methane phase digester at a pH between about 6.8 and 7.4 and a temperature between about 20 and 65 degrees C. to produce methane and a third effluent in a methane phase digestion step, removing the methane, and removing the third effluent from the methane phase digester to process a semisolid component and a liquid component of the effluent.

13. A method according to claim 12 further comprising:

contacting the wastewater with scrap iron, and allowing cementation to occur prior to delivering the wastewater to the reactor comprising sulfate-reducing bacteria.

14. A method according to claim 12 further comprising:

mixing at least a portion of said hydrogen sulfide with said wastewater prior to the sulfate reduction step, precipitating the metals in the wastewater as a metal sulfide sludge, and removing the metal sulfide sludge from said wastewater.

15. A method according to claim 12 further comprising:

collecting the methane produced during the acid phase digestion step and during the methane phase digestion step and using the methane to produce heat energy to heat the acid phase digester, the methane phase digester, and the reactor comprising sulfate-reducing bacteria.

16. A method according to claim 12 wherein the semisolid biomass fee is a municipal wastewater treatment sludge.

17. A method according to claim 12 wherein the sulfate reduction step and the methane production step occur in biofilms.

18. A method according to claim 12 wherein at least a part of the first effluent is returned to the acid phase digester, at least a part of the second effluent is returned to the reactor, and at least a part of the third effluent is returned to the methane phase digester.

19. A method according to claim 12 further comprising aerobic treatment of the component of the third effluent.

20. A method according to claim 12 further comprising operating the acid phase digester at a detention time in the range of 8 to 36 hours.

21. A method according to claim 12 further comprising removing a gas from the first effluent, the second effluent and the third effluent using vacuum degasification prior to separating the effluents into semisolid and liquid portions.

22. A method according to claim 12 further comprising anaerobically digesting the first semisolid portion of the first effluent prior to disposal.

23. A method according to claim 12 further comprising aerobically stabilizing and disinfecting the liquid component of the third effluent.

* * * * *